US009346182B2

(12) United States Patent
Horii et al.

(10) Patent No.: US 9,346,182 B2
(45) Date of Patent: May 24, 2016

(54) ROTARY DIE CUTTER

(71) Applicant: Horizon International Inc., Shiga (JP)

(72) Inventors: Yoshiyuki Horii, Shiga (JP); Toyoki Takeuchi, Shiga (JP); Jun Mochizuki, Shiga (JP); Takahiro Toshima, Shiga (JP)

(73) Assignee: Horizon International, Inc., Shiga (JP)

( * ) Notice: Subject to any disclaimer, the term of this patent is extended or adjusted under 35 U.S.C. 154(b) by 87 days.

(21) Appl. No.: 14/480,663

(22) Filed: Sep. 9, 2014

(65) Prior Publication Data

US 2015/0090089 A1 Apr. 2, 2015

(30) Foreign Application Priority Data

Oct. 1, 2013 (JP) ................................ 2013-206176

(51) Int. Cl.

| | |
|---|---|
| ***B23D 25/12*** | (2006.01) |
| ***B26D 5/08*** | (2006.01) |
| ***B26D 7/20*** | (2006.01) |
| ***B26F 3/02*** | (2006.01) |
| ***B65H 35/10*** | (2006.01) |
| ***B65C 9/22*** | (2006.01) |
| ***B29C 65/00*** | (2006.01) |
| ***B26D 7/26*** | (2006.01) |

(Continued)

(52) U.S. Cl.
CPC ................ *B26D 7/265* (2013.01); *B26F 1/384* (2013.01); *B26D 5/28* (2013.01); *B26D 7/0625* (2013.01); *Y10T 83/4833* (2015.04)

(58) Field of Classification Search
CPC ........ B26D 7/265; B26D 7/0625; B26D 5/28; B26F 1/384; Y10T 83/4833
USPC ........... 83/346, 348, 658, 659, 506, 566, 343, 83/564; 72/238, 239; 225/46, 56; 156/552, 156/357, 516
See application file for complete search history.

(56) References Cited

U.S. PATENT DOCUMENTS 3,448,684 A * 6/1969 Faudemay .............. B21B 31/30 100/171
3,908,426 A * 9/1975 Aramaki ................. B21B 13/10 72/238

(Continued)

FOREIGN PATENT DOCUMENTS

| | | |
|---|---|---|
| DE | 19814009 | 6/1999 |
| EP | 0899068 | 3/1999 |

(Continued)

*Primary Examiner* — Ghassem Alie
*Assistant Examiner* — Bharat C Patel
(74) *Attorney, Agent, or Firm* — Kirschstein, Israel, Schiffmiller & Pieroni, P.C.

(57) ABSTRACT

Each pair of bearing units for each of magnet and anvil rollers are movable in a vertical direction. Each of large diameter portions of the anvil roller is supported by a pair of support rollers. Each of large diameter portions of the magnet roller is pressed against the corresponding large diameter portion of the anvil roller by a pair of press rollers. Each stopper is moved between a first position in which it projects into a clearance between vertically opposed bearing units and a second position in which it retracts from the first position. When the stoppers are located at the first position, the opposed large diameter portions of the magnet and anvil rollers separate from each other, and when the stoppers are located at the second position, the opposed large diameter portions of the magnet and anvil rollers contact with each other.

4 Claims, 6 Drawing Sheets

(51) Int. Cl.

| | |
|---|---|
| ***B26F 1/38*** | (2006.01) |
| *B26D 5/28* | (2006.01) |
| *B26D 7/06* | (2006.01) |

(56) References Cited

U.S. PATENT DOCUMENTS

| | | | | | | |
|---|---|---|---|---|---|---|
| 4,205,596 | A | * | 6/1980 | Chesnut | B26D 1/626 | 100/170 |
| 4,255,998 | A | * | 3/1981 | Rudszinat | A24C 5/473 | 83/298 |
| 4,341,525 | A | * | 7/1982 | Wittkopf | B23D 35/007 | 493/370 |
| 4,359,919 | A | * | 11/1982 | Fuchs | B26D 7/2614 | 83/344 |
| 4,553,461 | A | * | 11/1985 | Belongia | B26D 7/00 | 83/342 |
| 4,759,247 | A | * | 7/1988 | Bell | B26D 7/2628 | 83/344 |
| 5,048,387 | A | * | 9/1991 | Niitsuma | B41F 13/62 | 83/344 |
| 5,058,472 | A | * | 10/1991 | Kakko-Chiloff | B23D 35/008 | 83/344 |
| 5,151,636 | A | * | 9/1992 | Winebarger | B26F 1/384 | 318/272 |
| 5,156,076 | A | * | 10/1992 | Rosemann | B26D 7/2628 | 100/168 |
| 5,174,185 | A | * | 12/1992 | Aichele | B26D 7/2628 | 83/346 |
| 5,388,490 | A | * | 2/1995 | Buck | B26D 7/2628 | 83/344 |
| 5,673,603 | A | * | 10/1997 | Aichele | B21B 31/30 | 100/168 |
| 5,765,460 | A | * | 6/1998 | Wathieu | B23D 36/005 | 83/311 |
| 6,694,873 | B1 | * | 2/2004 | LaBelle | B29C 59/04 | 101/23 |
| 7,299,729 | B2 | * | 11/2007 | Cox | B23D 35/008 | 83/343 |
| 7,594,461 | B2 | * | 9/2009 | Aichele | B26D 7/22 | 83/344 |
| 8,356,536 | B2 | * | 1/2013 | Madern | B23D 35/008 | 83/343 |
| 9,003,939 | B2 | * | 4/2015 | Dijon | B26D 1/405 | 83/343 |
| 9,156,180 | B2 | * | 10/2015 | Horii | B26D 7/18 | |
| 2004/0003699 | A1 | * | 1/2004 | Welch | A61F 13/15723 | 83/658 |

FOREIGN PATENT DOCUMENTS

| | | |
|---|---|---|
| EP | 1799409 | 6/2007 |
| JP | 2003-237018 | 8/2003 |
| JP | 2012-161859 | 8/2012 |
| WO | 2014135265 | 9/2004 |

* cited by examiner

ROTARY DIE CUTTER

TECHNICAL FIELD

The present invention relates to a rotary die cutter having a pair of a magnet roller on which a flexible die is mounted, and an anvil roller arranged opposite to the magnet roller and punching out a sheet which is supplied one by one between the magnet roller and the anvil roller.

BACKGROUND ART

A conventional rotary die cutter comprises a magnet roller, an anvil roller arranged opposite to the magnet roller, a flexible die which is magnetically mounted on the magnet roller, and a sheet feed unit supplying a sheet one by one between the magnet and anvil rollers, in which the sheet supplied from the sheet feed unit is punched out by the flexible die (the term "punch" may be used to denote not only its original meanings but also "emboss", "score", "perforate" and so on. The same applies hereinafter.) while the sheet is conveyed by the magnet and anvil rollers (See, for example, JP 2003-237018 A and JP 2012-161859 A).

In such rotary die cutter, each of the magnet and anvil rollers forms large diameter portions (generally referred to as "bearers") at both ends thereof and a small diameter portion at intermediate portion thereof, and the small diameter portion extends between the large diameter portions. Then, when the magnet and anvil rollers contact with each other at their bearers, a gap corresponding to a height of the die is formed between the small diameter portions of the magnet and anvil rollers.

Then the die is magnetically mounted on the periphery of the small diameter portion of the magnet roller, and the bearer of the magnet roller and the bearer of the anvil rollers are pressed against each other in order to prevent a failure of punching by keeping the gap between the magnet and anvil rollers constant, and then the punching operation is performed.

However, according to such configuration, one type of the die whose height corresponds to the gap can only be used because the size of the gap between the magnet and anvil rollers cannot be changed. Therefore, a punching operation using various types of dies whose heights are different from each other is considerably inconvenient because a dedicated rotary die cutter is required for each type of the die.

SUMMARY OF THE INVENTION

Problems to be Solved by the Invention

It is, therefore, an object of the present invention to provide a rotary die cutter capable of using two types of dies whose heights are different from each other.

Means for Solving the Problems

In order to achieve this object, according to the present invention, there is provided a rotary die cutter comprising: a frame provided with a path of sheets to be conveyed; a pair of first bearing units arranged at both sides of the path and attached to the frame so as to be moved in a vertical direction; a horizontal magnet roller supported by the pair of first bearing units and extending across and perpendicularly to the path; a pair of second bearing units arranged above or under the pair of first bearing units and attached to the frame so as to be moved in a vertical direction; a horizontal anvil roller supported by the pair of second bearing units and arranged opposite to the magnet roller, at least one of the magnet and anvil rollers forming large diameter portions at both ends thereof and a small diameter portion at intermediate portion thereof, the small diameter portion extending between the large diameter portions; a pair of support rollers attached to the frame and arranged under and opposite to each end of the lower roller of the magnet and anvil rollers so as to support the lower roller; a pair of press rollers arranged above and opposite to each end of the upper roller of the magnet and anvil rollers so as to be moved between a pressing position in which the pairs of press rollers press the both ends of the upper roller against both ends of the lower roller of the magnet and anvil rollers and a nonpressing position in which the pairs of press rollers retreat upward from the pressing position; a press mechanism attached to the frame so as to support and move the pairs of press rollers between the pressing position and the nonpressing position; a roller gap change unit attached to the frame and moving the bearing unit for the upper roller between a position in which the both ends of the magnet roller and the both ends of the anvil roller contact with each other and a position in which the both ends of the magnet roller and the both ends of the anvil roller separate from each other so as to switch between two different sizes of gaps between the intermediate portions of the magnet and anvil rollers, two different types of flexible dies whose heights correspond to the two different sizes of the gaps being able to magnetically mounted on the intermediate portion of the magnet roller; a pair of feed rollers arranged upstream of a pair of the magnet and anvil rollers; a first drive mechanism rotating the magnet and anvil rollers in such a way that the magnet and anvil rollers are rotated synchronously with each other at an equal circumferential velocity; and a second drive mechanism rotating the pair of feed rollers, wherein a sheet is supplied one by one between the pair of feed rollers, and punched by the flexible die while being conveyed through the gap between the magnet and anvil rollers by the pair of feed rollers.

According to a preferred embodiment of the present invention, a clearance is formed between each pair of the first bearing unit and the second bearing unit vertically opposed to each other when the both ends of the magnet roller and the both ends of the anvil roller contact with each other, wherein the roller gap change unit comprises: a slope formed on at least a part of one or both of the opposed surfaces of each pair of the first bearing unit and the second bearing unit; a stopper guided to move between a first position in which the stopper projects into the clearance and a second position in which the stopper retracts from the first position; and a stopper actuating mechanism attached to the frame so as to move the each of the stoppers, wherein each of the stoppers has an inclined surface engageable with the associated slope, and when each of the stoppers is located at the first position, the inclined surface of the stopper engages with the associated slope so that the both ends of the magnet roller and the both ends of the anvil roller separate from each other, and when each of the stoppers is located at the second position, the both ends of the magnet roller and the both ends of the anvil roller contact with each other, wherein the roller gap change unit further comprises a position adjusting mechanism provided for each of the stoppers and attached to the frame so as to be adjusted its position in a direction of linear movement of the associated stopper, and the leading end of the stopper contacts with the associated position adjusting mechanism when the stopper is located at the first position.

According to another preferred embodiment of the present invention, the stopper actuating mechanism is an air cylinder, and the stopper is fixed to a rod of the air cylinder. According to further preferred embodiment of the present invention, the stopper actuating mechanism is a solenoid actuator or a linear actuator including a motor as a drive source, and the stopper is fixed to an actuating element of the solenoid actuator or the linear actuator.

According to still further preferred embodiment of the present invention, the press mechanism comprises: a horizontal elongated roller support member extending above and parallel to the upper roller of the magnet and anvil rollers and movable in a vertical direction; and press screws vertically extending through the frame above both ends of the roller support member while engaging with the frame, wherein the press screws are attached to the roller support member so as to rotate around an axis thereof in their place, and the pairs of press rollers are supported by the both ends of the roller support member, and the pairs of press rollers are moved between the pressing position and the nonpressing position by the press screws being rotated in clockwise and counterclockwise directions.

Effect of the Invention

According to the present invention, at least one of the magnet and anvil rollers forms large diameter portions at its both ends and a small diameter portions at its intermediate portion, and the pair of the bearing units for the magnet roller and the pair of the bearings for the anvil rollers are movable in a vertical direction, and each end of the lower roller of the magnet and anvil rollers is supported by the pair of support rollers, the both ends of the upper roller of the magnet and anvil rollers can be pressed against the both ends of the lower roller. Further, a roller gap change unit is arranged to move the bearing unit for the upper roller between a position in which the both ends of the magnet roller and the both ends of the anvil roller contact with each other and a position in which the both ends of the magnet roller and the both ends of the anvil rollers separate from each other, and thereby it is possible to switch between two different sizes of gaps between the intermediate portions of the magnet and anvil rollers. Consequently, two different types of flexible dies whose height correspond to the two different sizes of the gap can be magnetically mounted on the intermediate portion of the magnet roller and therefore, so that two different types of flexible dies having different heights can be used in a single rotary die cutter.

BEST MODE FOR CARRYING OUT THE INVENTION

Figure 1:
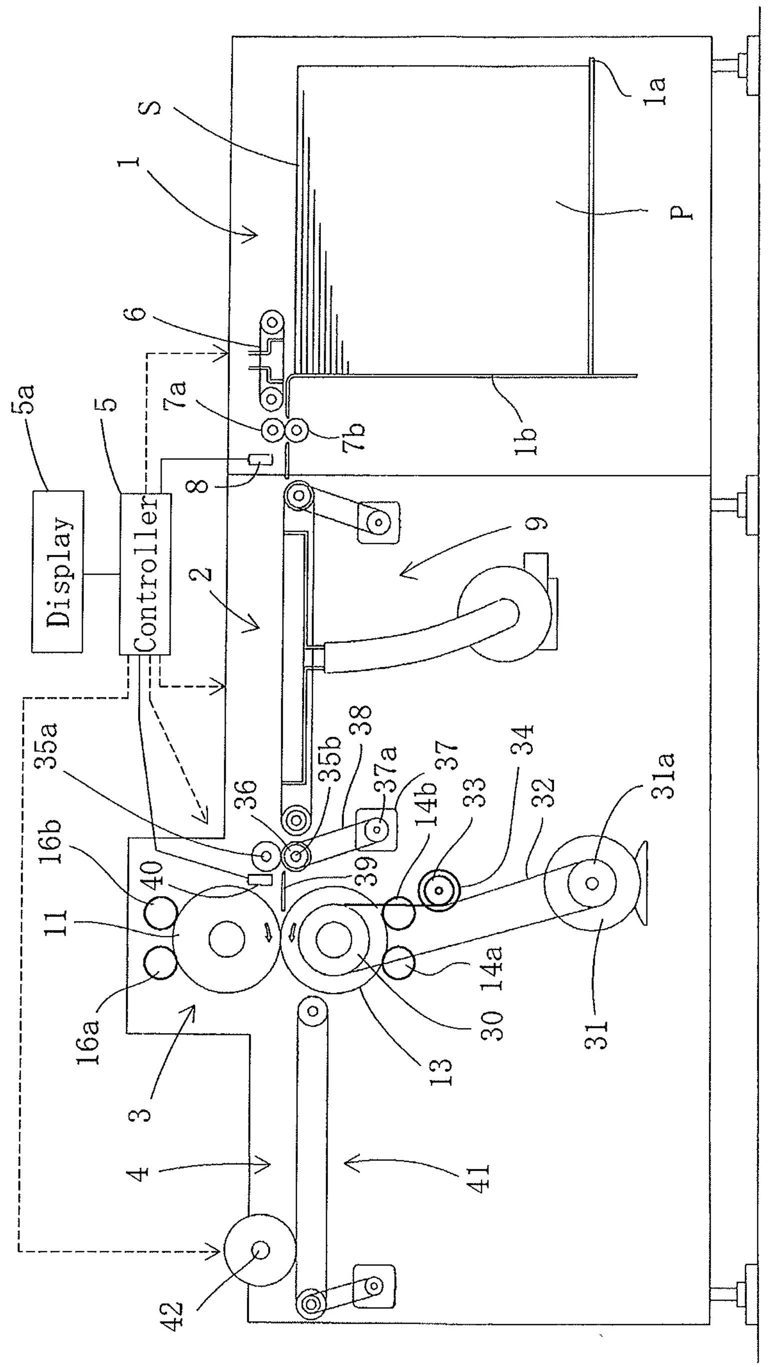
FIG. 1 is a side view schematically showing a configuration of a rotary die cutter according to an embodiment of the present invention.

A preferred embodiment of the present invention will be described below with reference to accompanying drawings. FIG. 1 is a side view schematically showing a configuration of a rotary die cutter according to an embodiment of the present invention. Referring to FIG. 1, a rotary die cutter according to the present invention comprises a sheet supply unit 1 supplying sheets S one by one from a sheet stack P, a conveyance unit 2 arranged downstream of the sheet supply unit 1 to convey the sheet S received from the sheet supply unit 1 while correcting the slant of the sheet S, a punching unit 3 arranged downstream of the conveyance unit 2, an ejecting unit 4 arranged downstream of the punching unit 3 to eject the punched sheet S, and a controller 5 controlling operations of the sheet supply unit 1, the conveyance unit 2, the punching unit 3 and the ejecting unit 4.

The sheet supply unit 1 comprises a horizontal shelf 1*a*, on which the sheet stack P is placed, arranged for a vertical movement, an elevating mechanism (not shown) moving the shelf 1*a*, and a suction conveyor unit 6 arranged above and opposite to the uppermost sheet S of the sheet stack P so as to suck the upper most sheet S and discharge it forward beyond a sheet alignment plate 1*b*. In this embodiment, the suction conveyor unit 6 is composed of a suction conveyor belt, but, for example, a suction rotor may be used in place of the suction conveyor belt. Although not shown in the drawings, a sensor for detecting height of the sheet stack P on the shelf 1*a* is provided, and, based on detection signals of the sensor, the shelf 1*a* is raised by an amount corresponding to decrease in the height of the sheet stack P each time the height of the sheet stack P decreases by a certain amount.

Then the suction conveyor belt 6 is circulated and the suction operation of the suction conveyor belt 6 is repeated at certain intervals while the shelf 1*a* is raised by degrees in order to constantly put the uppermost sheet S of the sheet stack P within the range of suction by the suction conveyor belt 6, so that the sheets S are supplied one by one from the sheet supply unit 1.

A pair of feed rollers 7*a*, 7*b* is arranged adjacent to the downstream end of the suction conveyor belt 6. The pair of feed rollers 7*a*, 7*b* is constantly rotated in the direction in which the feed rollers 7*a*, 7*b* receive the sheet S from the suction conveyor belt 6, and the suction conveyor belt 6 is stopped whenever the sheet S is nipped between the pair of feed rollers 7*a*, 7*b*. A first sensor 8 is arranged at the exit of the pair of feed rollers 7*a*, 7*b* so as to detect the leading end of the sheet S. Detection signals of the first sensor 8 are sent to the controller 5.

In this embodiment, the conveyance unit 2 is composed of a suction conveyor belt 9. Although not shown in the drawings, a publicly known slant correction unit is arranged on the conveying surface of the suction conveyor belt 9 so as to correct the slant of the sheet S conveyed. Thus the suction conveyor belt 9 performs the suction while circulating so that the sheet S supplied from the sheet supply unit 1 is conveyed to the punching unit 3 while being sucked by the suction conveyor belt 9 at the underside thereof.

Figure 2:
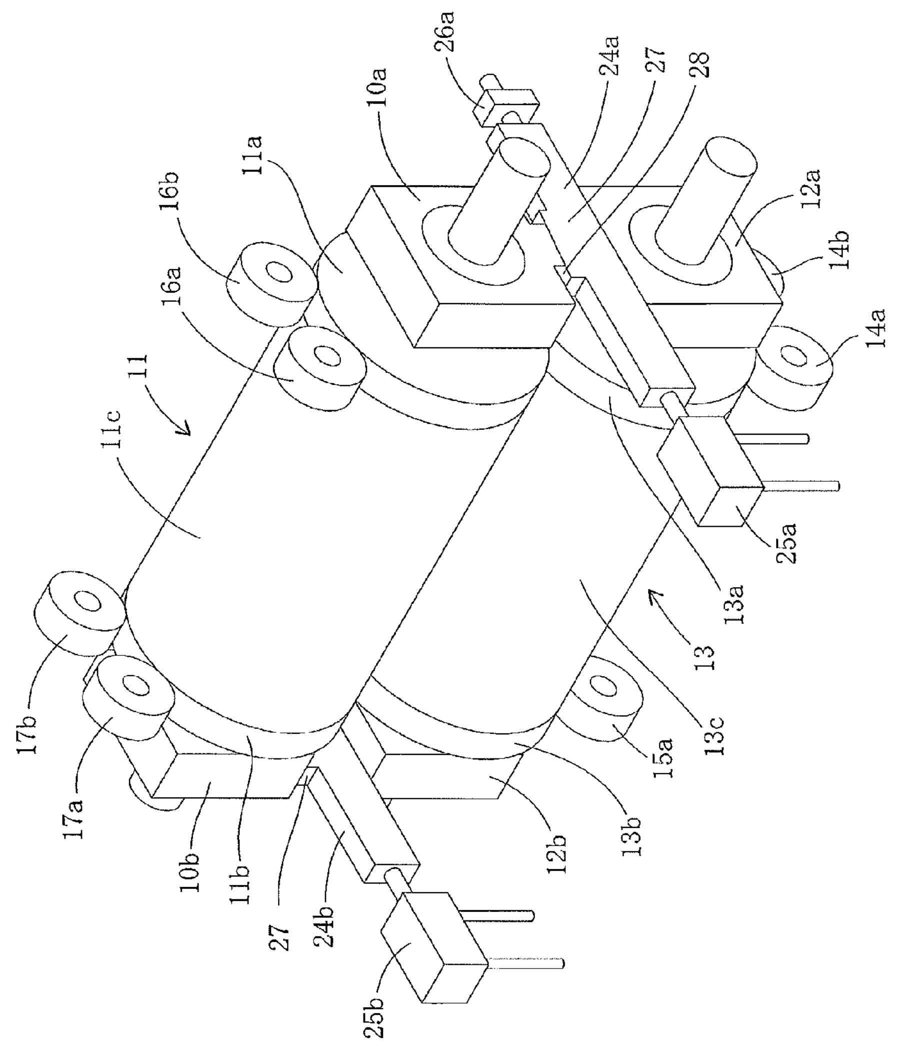
FIG. 2 is a perspective view illustrating a main part of a punching unit of the rotary die cutter shown in FIG. 1.
Figure 3B:
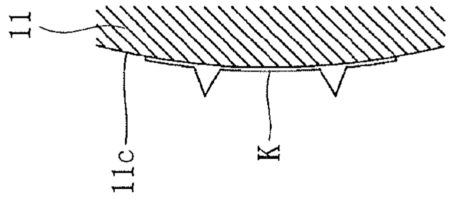
FIGS. 3B and 3C are sectional views illustrating a situation of mounting of a flexible die when each of the stoppers is located at the first position.
Figure 3C:
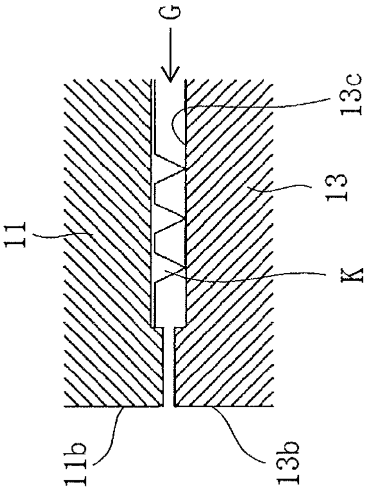
Figure 3A:
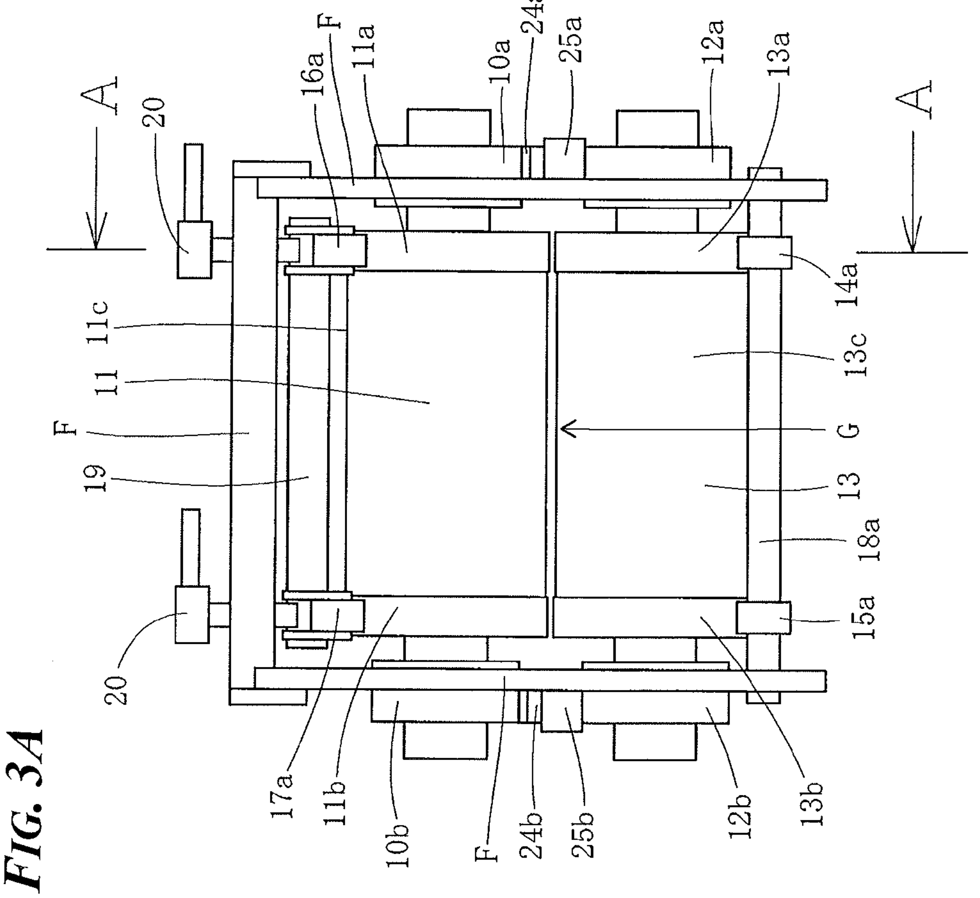
FIG. 3A is a perspective view of the punching unit shown in FIG. 2 as viewed from a downstream when each of stoppers is located at a first position.
Figure 4B:
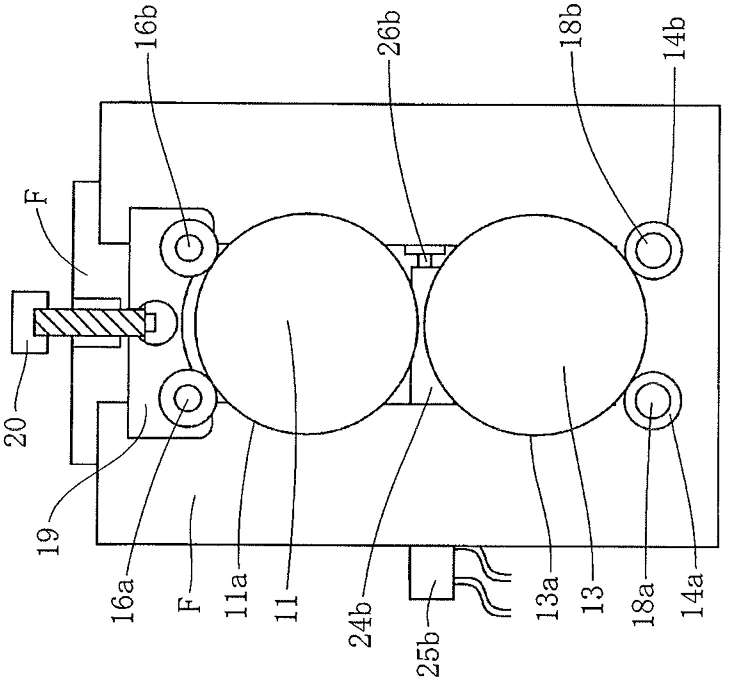
FIG. 4B is a sectional view taken along an A-A line in FIG. 3A.
Figure 4A:
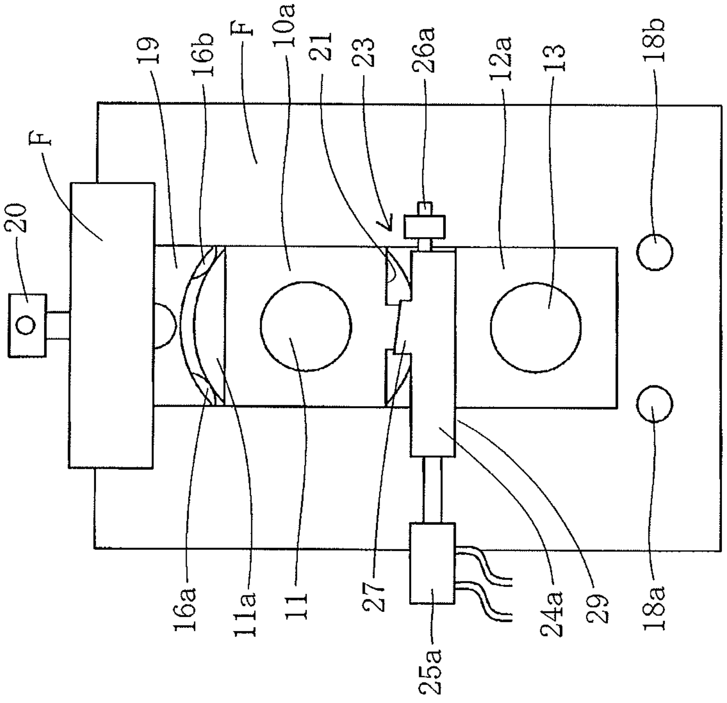
FIG. 4A is a side view of the punching unit shown in FIG. 3A.
Figure 5B:
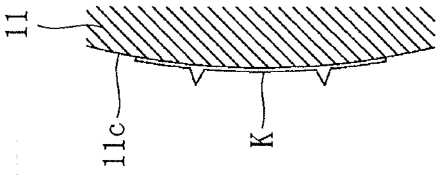
FIGS. 5B and 5C are sectional views illustrating a situation of mounting of a flexible die when the each of stoppers is located at the second position.
Figure 5C:
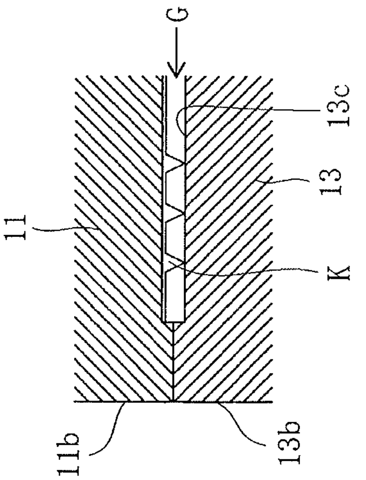
Figure 5A:
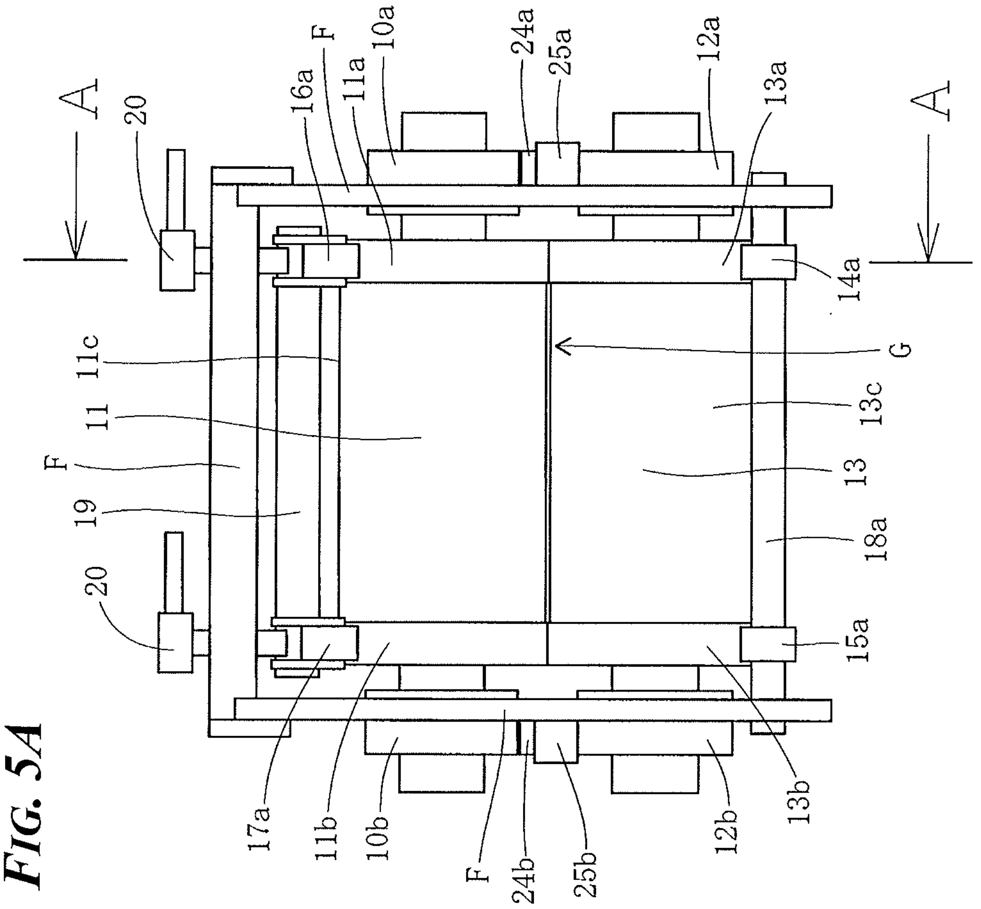
FIG. 5A is a side view of the punching unit shown in FIG. 2 as viewed from the downstream when each of the stoppers is located at a second position.
Figure 6B:
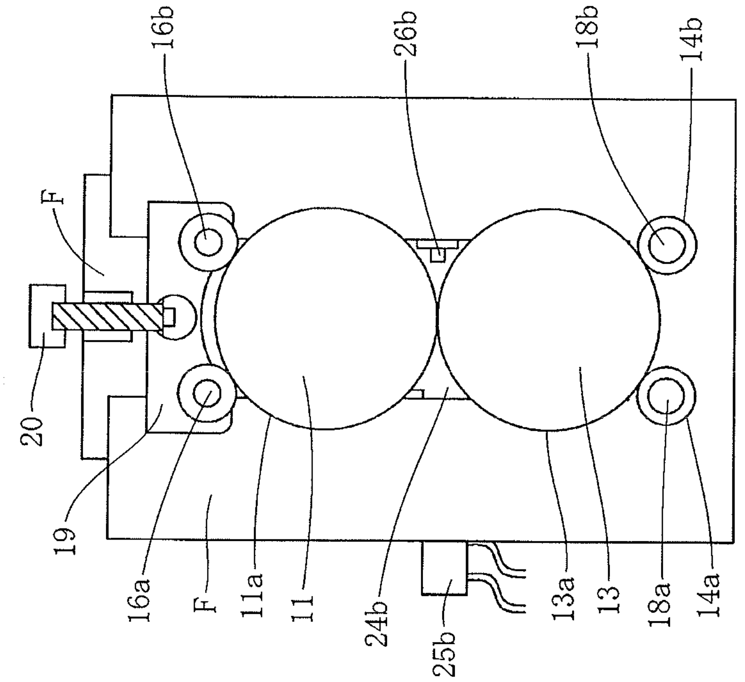
FIG. 6B is a sectional view taken along an A-A line in FIG. 5A.
Figure 6A:
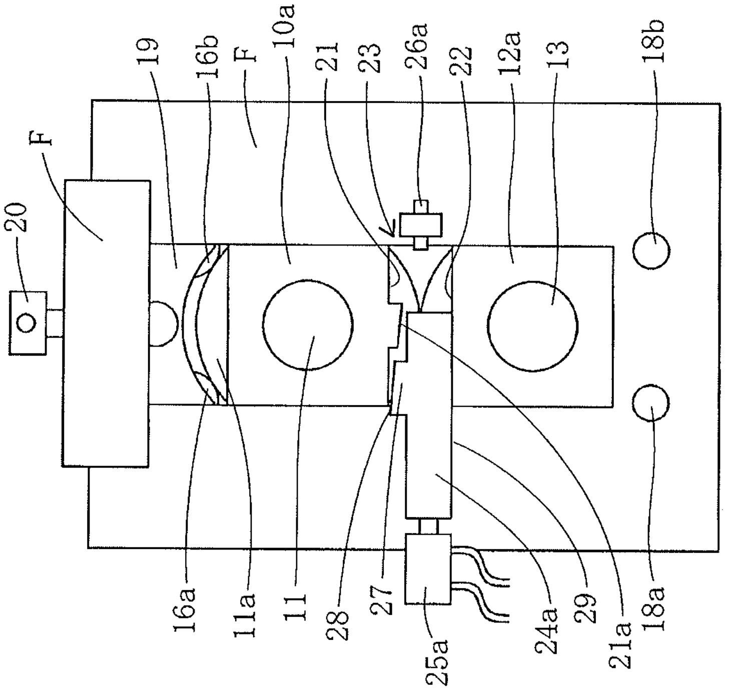
FIG. 6A is side view of the punching unit shown in FIG. 5A.

FIG. 2 is a perspective view illustrating a main part of a punching unit of the rotary die cutter shown in FIG. 1. FIG. 3A is a perspective view of the punching unit shown in FIG. 2 as viewed from a downstream when each of stoppers is located at a first position, and FIGS. 3B and 3C are sectional views illustrating a situation of mounting of a flexible die when each of the stoppers is located at the first position. FIG. 4A is a side view of the punching unit shown in FIG. 3A, and FIG. 4B is a sectional view taken along an A-A line in FIG. 3A. FIG. 5A is a side view of the punching unit shown in FIG. 2 as viewed from the downstream when each of the stoppers is located at a second position. FIGS. 5B and 5C are sectional views illustrating a situation of mounting of a flexible die when each of the stoppers is located at the second position. FIG. 6A is side view of the punching unit shown in FIG. 5A, and FIG. 6B is a sectional view taken along an A-A line in FIG. 5A.

Referring to FIGS. 2 through 6, the punching unit 3 comprises a frame F provided with a path of the sheets S to be conveyed, a pair of first bearing units 10*a*, 10*b* arranged at both sides of the path and attached to the frame F so as to be moved in a vertical direction, a horizontal magnet roller 11 supported by the pair of first bearing units 10*a*, 10*b* and extending across and perpendicularly to the path, a pair of second bearing units 12*a*, 12*b* arranged under the pair of first bearing units 10*a*, 10*b* and attached to the frame F so as to be moved in a vertical direction, and a horizontal anvil roller 13 supported by the pair of second bearing units 12*a*, 12*b* and arranged opposite to the magnet roller 11.

In this case, positional relationship between the magnet and anvil rollers 11, 13 in a vertical direction is not limited to this embodiment, and the anvil roller 13 may be arranged above and opposite to the magnet roller 11.

Each of the magnet and anvil rollers 11, 13 forms large diameter portions 11*a*, 11*b*; 13*a*, 13*b* at its both ends and a small diameter portion 11*c*, 13*c* at its intermediate portion, the small diameter portion 11*c*, 13*c* extending between the large diameter portions 11*a*, 11*b*; 13*a*, 13*b*. In this embodiment, both of the magnet and anvil rollers 11, 13 have the large and small diameter portions 11*a*-11*c*; 13*a*-13*c*, but, instead, it is possible to adopt the configuration that one of the magnet and anvil rollers 11, 13 has the large and small diameter portions, and the other has a constant diameter along its length.

The punching unit 3 also comprises a pair of support rollers 14*a*, 14*b*; 15*a*, 15*b* attached to the frame F and arranged under and opposite to each of the large diameter portions 13*a*, 13*b* of the anvil roller 13 so as to support the anvil roller 13. In this embodiment, under the anvil roller 13, a pair of parallel rotary shafts 18*a*, 18*b* is supported by the frame F and extends parallel to the anvil roller 13. On each of the rotary shafts 18*a*, 18*b*, a pair of the support rollers 14*a*, 15*a*; 14*b*, 15*b* is mounted to be rotated with the associated rotary shaft 18*a*, 18*b* in an integrated fashion.

The punching unit 3 also comprises a pair of press rollers 16*a*, 16*b*; 17*a*, 17*b* arranged above and opposite to each of the large diameter portions 11*a*, 11*b* of the magnet roller 11 so as to be moved between a pressing position in which the pairs of press rollers 16*a*, 16*b*; 17*a*, 17*b* press the large diameter portions 11*a*, 11*b* of the magnet roller 11 against the large diameter portions 13*a*, 13*b* of the anvil roller 13 and a nonpressing position in which the pairs of press rollers 16*a*, 16*b*; 17*a*, 17*b* retract upward from the pressing position, and a press mechanism attached to the frame F so as to support and move the pairs of press rollers 16*a*, 16*b*; 17*a*, 17 between the pressing position and the nonpressing position.

In this embodiment, the press mechanism comprises a horizontal elongated roller support member 19 extending above and parallel to the magnet roller 11 and movable in a vertical direction, and press screws 20 vertically extending through the frame F above both ends of the roller support member 19 while engaging with the frame F. The press screws 20 are attached to the roller support member 19 so as to rotate around an axis thereof in their place. The pairs of press rollers 16*a*, 16*b*; 17*a*, 17*b* are supported by the both ends of the roller support member 19. The pairs of press rollers 16*a*, 16*b*; 17*a*, 17*b* are moved between the pressing position and the nonpressing position by the press screws 20 being rotated in clockwise and counterclockwise directions.

In this embodiment, each of the first and second bearing units 10*a*, 10*b*, 12*a*, 12*b* is square plate-shaped, and has a bearing body at its center. When the large diameter portions 11*a*, 11*b* of the magnet roller 11 and the large diameter portions 13*a*, 13*b* of the anvil roller 13 contact with each other, a clearance 23 is formed between each pair of the first bearing unit 10*a*, 10*b* and the second bearing unit 12*a*, 12*b* which are vertically opposed to each other.

The upper surface 22 of each of the second bearing units 12*a*, 12*b* extends horizontally while the lower surface 21 of each of the first bearing units 10*a*, 10*b* projects downwardly (toward the associated second bearing unit 12*a*, 12*b*) at the middle thereof so as to form a slope 21*a*. In this embodiment, a part of the lower surface 21 of each of the first bearing units 10*a*, 10*b* forms the slope 21*a*, but, according to the present invention, at least one of the opposed surfaces 21, 22 of each pair of the first bearing unit 10*a*, 10*b* and the second bearing unit 12*a*, 12*b* which are vertically opposed to each other has only to be at least partially formed as a slope. Thus, for example, the whole of the lower surface 21 of each first bearing unit 10*a*, 10*b* may be formed as a slope, or both the lower surface 21 of each first bearing unit 10*a*, 10*b* and the upper surface 22 of each second bearing unit 12*a*, 12*b* may be at least partially formed as slopes. In the latter case, the slopes of the first and second bearing units 10*a*, 10*b*; 12*a*, 12*b* are opposed to each other so as to form wedge-shaped clearances therebetween.

In this embodiment, each of the first and second bearing units 10*a*, 10*b*; 12*a*, 12*b* is square plate-shaped, but the shape of the first and second bearing units 10*a*, 10*b*; 12*a*, 12*b* is not limited to this embodiment. Thus the first and second bearing units have arbitrary shapes in so far as the above-mentioned clearances and the above-mentioned slopes are formed.

The punching unit further comprises a roller gap change unit attached to the frame F and moving the first bearing units 10*a*, 10*b* between a position in which the both ends (in this embodiment, the large diameter portions 11*a*, 11*b*) of the magnet roller 11 and the both ends (in this embodiment, the large diameter portions 13*a*, 13*b*) of the anvil roller 13 contact with each other and a position in which the both ends of the magnet roller 11 and the both ends of the anvil roller 13 separate from each other so as to switch between two different sizes of gaps between the intermediate portions 11*c*, 13*c* of the magnet and anvil rollers 11, 13.

In this embodiment, the roller gap change unit has a stopper 24*a*, 24*b* provided for each pair of the opposed first and second bearing units 10*a*, 12*a*; 10*b*, 12*b*. Each of the stoppers 24*a*, 24*b* is guided to move between a first position in which the stopper 24*a*, 24*b* projects into the associated clearance 23 between the first and second bearing units 10*a*, 10*b*; 12*a*, 12*b* (see FIGS. 3 and 4) and a second position in which the stopper 24*a*, 24*b* retracts from the first position (see FIGS. 5 and 6). Each of the stoppers 24*a*, 24*b* is an elongated member having a square cross-section, and can slide in a horizontal direction along the upper surface 22 of the associated second bearing unit 12*a*, 12*b* at a flat side surface 29 thereof. Each of the stoppers 24*a*, 24*b* is also provided with a protruding portion 27 at the middle of the upper surface (a side surface opposite to the side surface 29) thereof, and the upper surface of the protruding portion 27 forms an inclined surface 28 engageable with the slope 21*a* of the associated first bearing unit 10*a*, 10*b*.

The roller gap change unit also has an air cylinder 25*a*, 25*b* provided for each stopper 24*a*, 24*b* and attached to the frame F. The stopper 24*a*, 24*b* is fixed to the associated air cylinder 25*a*, 25*b*. Thus the air cylinders 25*a*, 25*b* cause a reciprocating slide motion of the pair of stoppers 24*a*, 24*b*, and as shown in FIGS. 3 and 4, when the pair of stoppers 24*a*, 24*b* is located at the first position, the inclined surfaces 28 of the stoppers 24*a*, 24*b* engage with the slopes 21*a* of the first bearing units 10*a*, 10*b* so that the large diameter portions 11*a*, 11*b* of the magnet roller 11 and the large diameter portions 13*a*, 13*b* of the anvil rollers 13 separate from each other, on the other hand, as shown in FIGS. 5 and 6, when the pair of stoppers 24*a*, 24*b* is located at the second position, the engagement between the inclined surfaces 28 of the stoppers 24*a*, 24*b* and the slopes 21*a* of the first bearing units 10*a*, 10*b* is released so that the large diameter portions 11*a*, 11*b* of the magnet roller 11 and the large diameter portions 13*a*, 13*b* of the anvil roller 11 contact with each other. In this case, it goes without saying that such slide motion of the pair of stoppers 24*a*, 24*b* is carried out when the pair of press rollers 16*a*, 16*b* is located at the nonpressing position.

Although not shown in the drawings, position detection sensors (for example, proximity sensors) detecting when the stoppers 24*a*, 24*b* are located at the first or second positions are attached to the frame F, and detection signals of the position detection sensors are sent to the controller 5.

Thus the switching between two sizes of gaps G between the small diameter portion (intermediate portion) 11*c* of the magnet roller 11 and the small diameter portion (intermediate portion) 13*c* of the anvil roller 13 is achieved by switching between the first and second positions of the pair of stoppers 24*a*, 24*b*. As a result, two different types of flexible dies K whose heights correspond to the two different sizes of the gaps G can be magnetically mounted on the intermediate portion 11*c* of the magnet roller 11 (see FIGS. 3B, 3C, 5B and 5C).

The roller gap change unit further comprises a position adjusting mechanism 26*a*, 26*b* provided for each of the stoppers 24*a*, 24*b*. Each of the position adjusting mechanism 26*a*, 26*b* is arranged at a side of the frame F away from the air cylinder 25*a*, 25*b* and attached to the frame F so as to be adjusted its position in a direction of linear movement of the associated stopper 24*a*, 24*b*. The leading end of the stopper 24*a*, 24*b* contacts with the associated position adjusting mechanism 26*a*, 26*b* when the stopper 24*a*, 24*b* is located at the first position.

According to the present invention, the amount of the engagement between the slopes 21*a* of the first bearing units 10*a*, 10*b* and the inclined surfaces 28 of the stoppers 24*a*, 24*b* can be changed by the position adjusting mechanisms 26*a*, 26*b* and thereby the size of the gap G between the small diameter portion 11*c* of the magnet roller 11 and the small diameter portion 13*c* of the anvil roller 13 at the first position of the stoppers 24*a*, 24*b* can be easily changed or adjusted.

The configuration of the stoppers 24*a*, 24*b* is not limited to this embodiment. Thus the stoppers 24*a*, 24*b* may have any configuration adapted to shapes of the clearances between the pairs of the first bearing unit 10*a*, 10*b* and the second bearing unit 12*a*, 12*b* or shapes of the slopes of the lower and upper surfaces of the first and second bearing units 10*a*, 10*b*; 12*a*, 12*b*. In this embodiment, the air cylinder is used as a stopper actuating mechanism, but instead of the air cylinder, a solenoid actuator or a linear actuator including a motor as a drive source may be used, and each of the stoppers 24*a*, 24*b* is fixed to an actuating element of the solenoid actuator or the linear actuator.

In this embodiment, the roller gap change unit comprises the slope 21*a* formed at least one of the opposed surfaces 21, 22 of the first and second bearing units 10*a*, 12*a*; 10*b*, 12*b* which are vertically opposed to each other, the stopper actuating mechanisms composed of the air cylinders 25*a*, 25*b*, and the position adjusting mechanisms 26*a*, 26*b*, but the configuration of the roller gap change unit is not limited to this embodiment. Thus the roller gap change unit may be any configuration in so far as the roller gap change unit can switch between two sizes of the gaps G between the intermediate portions 11*c*, 13*c* of the magnet and anvil rollers 11, 13 by moving the first bearing units 10*a*, 10*b* in a vertical direction.

The switching of the size of the gap G is performed as follows. The controller 5 has a touch screen 5*a*, and for example, when preset sizes of the gap G are 0.8 mm and 1.0 mm, although not shown in the drawings, a button (an icon) marked "0.8 mm" and a button (an icon) marked "1.0 mm" are displayed on a screen for switch of gap size of the touch screen 5*a*. In this case, based on detection signals of the position detection sensors, the controller 5 indicates an operator which of the sizes is presently set by for example, highlighting one of the buttons.

Prior to the switching of the gap size, each pair of press rollers 16*a*, 16*b*; 17*a*, 17*b* is moved from the pressing position to the nonpressing position by the operator handling the press screws 20. Then, for example, when the present size of the gap G is 0.8 mm, the operator touches the button marked "1.0 mm" on the touch screen 5*a*, and the controller 5 responds to this touching to move the stoppers 24*a*, 24*b* (from the second position to the first position in this case). After that, each of the pairs of press rollers 16*a*, 16*b*; 17*a*, 17*b* is moved from the nonpressing position to the pressing position by the operator handling the press screws 20, and the switching of the gap size is completed.

Referring to FIG. 1 again, the anvil roller 13 is provided with a pulley 30 at a shaft thereof and a motor 31 is arranged below the anvil roller 13. A drive shaft of the motor 31 is provided with a pulley 31*a* and extends parallel to the anvil roller 13. A timing belt 32 extends between the pulleys 30, 31*a*. The anvil roller 13 is rotated by the motor 31. A shaft of the magnet roller 11 is coupled to the shaft of the anvil roller 13 through a connecting mechanism (not shown) in such a way that the magnet and anvil rollers 11, 13 are rotated synchronously with each other at an equal circumferential velocity.

The motor 31, the pulleys 30, 31*a*, the timing belt 32 and the connecting mechanism (not shown) construct a first drive mechanism rotating the magnet and anvil rollers 11, 13.

A rotary encoder 34 is arranged between the anvil roller 13 and the motor 31. A rotary shaft of the rotary encoder 34 is provided with a pulley 33 and extends parallel with the shaft of the anvil roller 13. The pulley 33 contacts with the timing belt 32 so as to be rotated by the circulation of the timing belt 32. The controller 5 detects a rotational position of the anvil roller 13, that is, the magnet roller 11 (that is, the flexible die K) based on pulses outputted from the rotary encoder 34.

The punching unit 3 further comprises a pair of feed rollers 35*a*, 35*b* arranged upstream of and at a distance from the pair of magnet and anvil rollers 11, 13 and arranged adjacent to the downstream of the suction conveyor belt 2. The pair of feed rollers 35*a*, 35*b* consists of a pair of rollers which are arranged opposite to each other in a vertical direction and extend parallel to the magnet and anvil rollers 11, 13.

A lower roller 35*b* of the pair of feed rollers 35*a*, 35*b* is provided with a pulley 36 at a shaft thereof. A servo motor 37 is arranged below the lower roller 35*b*, and a drive shaft of the servo motor 37 is provided with a pulley 37*a* and extends parallel to the lower roller 35*b*. A timing belt 38 extends between the pulleys 36, 37*a* so that the pair of feed rollers 35*a*, 35*b* are rotated by the servo motor 37. The servo motor 37, the pulleys 36, 37*a* and the timing belt 38 construct a second drive mechanism rotating the pair of feed rollers 35*a*, 35*b*.

Thus the magnet and anvil rollers 11, 13 are constantly rotated in a direction to receive the sheet S from the pair of feed rollers 35*a*, 35*b*, and the sheet S fed from the suction conveyor belt (conveyance unit) 2 into a gap between the pair of feed rollers 35*a*, 35*b* is punched by the flexible die K while being conveyed by the pair of feed rollers 35*a*, 35*b* through the gap between the magnet and anvil rollers 11, 13.

A second sensor 40 is arranged downstream of the pair of feed rollers 35*a*, 35*b* so as to detect the passage of a leading end of the sheet S. Detection signals of the second sensor 40 are sent to the controller 5. A flat support plate 39 is arranged between the pair of feed rollers 35*a*, 35*b* and the pair of magnet and anvil rollers 11, 13 so as to support the underside of the sheet S conveyed by the pair of feed rollers 35*a*, 35*b*. The support plate 39 is provided if needed.

Thus before start of the motion of the rotary die cutter, the data about the punching of the sheet such as a size of the sheet S and a distance from the leading end of the sheet S to a leading end of a punching range on the sheet S is inputted to the controller 5 through the touch screen 5*a*. Then the rotary die cutter starts the motion, and when a first sheet S is supplied from the sheet stack P by the sheet supply unit 1, the controller 5 measures a time from when the suction conveyor belt 6 of the sheet supply unit 1 starts the motion till when the leading end of the first sheet S passes through the second sensor 40. Thus a timing of sheet supply by the sheet supply unit 1, that is, a timing of the motion of the suction conveyor belt 6 is corrected based on difference between the measured value and the preset value.

After that, subsequent sheets S after a second sheet S are supplied by the sheet supply unit 1 one by one at the corrected timing. The sheet S supplied from the sheet supply unit 1 is conveyed by the suction conveyor belt 2, and fed from the suction conveyor belt 2 into the gap between the pair of feed rollers 35*a*, 35*b*. In this case, the suction conveyor belt 2 is constantly circulated.

In addition to the correction of the timing of sheet supply of the sheet supply unit 1, the rotation of the pair of feed rollers 35*a*, 35*b* is controlled based on the detection signals of the second sensor 40. Thus the sheet S fed to the pair of feed rollers 35*a*, 35*b* is conveyed to the gap between the magnet and anvil rollers 11, 13 along the support plate 39 by the pair of feed rollers 35*a*, 35*b*. When the leading end of the sheet S passes through the second sensor 40, based on the detection signal of the sensor 40, the rotation of the pair of feed rollers 35*a*, 35*b* is controlled corresponding to a peripheral velocity and a rotational position of the flexible die K in such a manner that the leading end of the punching range on the sheet S coincides with the leading end of the flexible die K at the lowest point of the periphery of the magnet roller 11.

The sheet supply to the pair of magnet and anvil rollers 11, 13 at a precise timing by the control of the rotation of the pair of feed rollers 35*a*, 35*b* based on the detection signals of the second sensor 40 as well as the correction of the timing of sheet supply of the sheet supply unit 1.

The ejecting unit 4 comprises a conveyor belt 41 extending from an exit of the pair of magnet and anvil rollers 11, 13 to an exit of the rotary die cutter, a feed roller 42 arranged adjacent to the downstream of the conveyor belt 41. The feed roller 42 extends perpendicularly to the conveyor belt 41 and contacts the conveyance surface of the conveyor belt 41. The sheet S punched by the punching unit 3 is conveyed by the conveyor belt 41 and the feed roller 42 and discharged from the exit of the rotary die cutter.

DESCRIPTION OF REFERENCE NUMERALS

1 Sheet supply unit
1*a* Shelf
1*b* Sheet alignment plate
2 Conveyance unit (Suction conveyor belt)
3 Punching unit
4 Ejecting unit
5 Controller
5*a* Touch screen
6 Suction conveyor belt
7*a*, 7*b* Pair of feed rollers
8 First sensor
9 Suction conveyor belt
10*a*, 10*b* First bearing unit
11 Magnet roller
11*a*, 11*b* Large diameter portion
11*c* Small diameter portion
12*a*, 12*b* Second bearing unit
13 Anvil roller
13*a*, 13*b* Large diameter portion
13*c* Small diameter portion
14*a*, 14*b*, 15*a*, 15*b* Support roller
16*a*, 16*b*, 17*a*, 17*b* Press roller
18*a*, 18*b* Rotary shaft
19 Roller support member
20 Press screw
21 Lower surface
21*a* Slope
22 Upper surface
23 Clearance
24*a*, 24*b* Stopper
25*a*, 25*b* Air cylinder
26*a*, 26*b* Position adjusting mechanism
27 Protruding portion
28 Inclined surface
29 Side surface
30 Pulley
31 Motor
31*a* Pulley
32 Timing belt
33 Pulley
34 Rotary encoder
35*a*, 35*b* Pair of feed rollers
36 Pulley
37 Servo motor
38 Timing belt
39 Support plate
40 Second sensor
41 Conveyor belt
42 Feed roller
F Frame
G Gap
K Flexible die
P Sheet stack
S Sheet

The invention claimed is:

1. A rotary die cutter comprising:

a frame provided with a path of sheets to be conveyed;

a pair of first bearing units arranged at both sides of the path and attached to the frame;

one roller of a magnet roller and an anvil roller supported by the pair of first bearing units and extending across and perpendicularly to the path;

a pair of second bearing units arranged above the pair of first bearing units and attached to the frame so as to be moved in a vertical direction;

the other roller of the magnet roller and the anvil roller supported by the pair of second bearing units and arranged opposite to the one roller, at least one of the magnet and anvil rollers forming large diameter portions at both ends thereof and a small diameter portion at an intermediate portion thereof, the small diameter portion extending between the large diameter portions;

a pair of support rollers attached to the frame and arranged under and opposite to each end of the one roller so as to support the one roller;

a pair of press rollers arranged above and opposite to each end of the other roller so as to be moved between a pressing position in which the pairs of press rollers press the both ends of the other roller against the both ends of the one roller and a nonpressing position in which the pairs of press rollers retreat upward from the pressing position;

a press mechanism attached to the frame so as to support and move the pairs of press rollers between the pressing position and the nonpressing position;

a roller gap change unit attached to the frame and moving the bearing unit for the other roller between a position in which the both ends of the magnet roller and the both ends of the anvil roller contact with each other and a position in which the both ends of the magnet roller and the both ends of the anvil roller separate from each other so as to switch between two different sizes of gaps between the intermediate portions of the magnet and anvil rollers, two different types of flexible dies whose heights correspond to the two different sizes of the gaps being able to be magnetically mounted on the intermediate portion of the magnet roller;

a pair of feed rollers arranged upstream of a pair of the magnet and anvil rollers;

a first drive mechanism rotating the magnet and anvil rollers in such a way that the magnet and anvil rollers are rotated synchronously with each other at an equal circumferential velocity; and a second drive mechanism rotating the pair of feed rollers, wherein a clearance is formed between each pair of the first bearing unit and the second bearing unit vertically opposed to each other when the both ends of the ma net roller and the both ends of the anvil roller contact with each other, wherein the roller map change unit comprises:

a slope formed on at least a part of one or both of the opposed surfaces of each pair of the first bearing unit and the second bearing unit;

a stopper guided to move between a first position in which the stopper projects into the clearance and a second position in which the stopper retracts from the first position; and a stopper actuating mechanism attached to the frame so as to move the each of the stoppers, wherein each of the stoppers has an inclined surface engageable with the associated slope, and when each of the stoppers is located at the first position, the inclined surface of the stopper engages with the associated slope so that the both ends of the magnet roller and the both ends of the anvil roller separate from each other, and when each of the stoppers is located at the second position, the both ends of the magnet roller and the both ends of the anvil roller contact with each other, wherein the roller gap change unit further comprises a position adjusting mechanism provided for each of the stoppers and attached to the frame so as to be adjusted at a position thereof in a direction of linear movement of the associated stopper, and the leading end of stopper contacts with the associated position adjusting mechanism when the stopper is located at the first position, wherein a sheet is supplied one by one between the pair of feed rollers, and punched by the flexible die while being conveyed through the gap between the magnet and anvil rollers by the pair of feed rollers.

2. The rotary die cutter according to claim 1, wherein the stopper actuating mechanism is an air cylinder, and wherein the stopper is fixed to a rod of the air cylinder.

3. The rotary die cutter according to claim 1, wherein the stopper actuating mechanism is a solenoid actuator or a linear actuator including a motor as a drive source, and wherein the stopper is fixed to an actuating element of the solenoid actuator or the linear actuator.

4. The rotary die cutter according to claim 1, wherein the press mechanism comprises:

a horizontal elongated roller support member extending above and parallel to the other roller and movable in a vertical direction; and press screws vertically extending through the frame above both ends of the roller support member while engaging with the frame, wherein the press screws are attached to the roller support member so as to rotate around an axis thereof in their place, and the pairs of press rollers are supported by the both ends of the roller support member, and the pairs of press rollers are moved between the pressing position and the nonpressing position by the press screws being rotated in clockwise and counterclockwise directions.

* * * * *